3,465,060
POLYOLEFINS CONTAINING A MINOR AMOUNT OF A POLYAMIDE HAVING SECONDARY OR TERTIARY AMINE GROUPS

Joseph Oldham, Manchester, England, assignor to Imperial Chemical Industries Limited, London, England, a corporation of Great Britain
No Drawing. Filed Jan. 16, 1967, Ser. No. 609,284
Claims priority, application Great Britain, Jan. 20, 1966, 2,642/66
Int. Cl. C08f 29/10
U.S. Cl. 260—857               11 Claims

ABSTRACT OF THE DISCLOSURE

Acid dyeable stereoregular polyolefine compositions containing 0.05–1.0% basic nitrogen in the form of a dibasic polyamide formed by reaction of one or more dicarboxylic acids, a polyamine and a lactam.

---

This invention relates to modified olefine polymers having an affinity for acid dyestuffs and is a modification of the polyolefine compositions of copending cognate British patent specification No. 1,055,175.

In the specification of the foregoing patent are described stereoregular polyolefine compositions containing 0.1–1.0% by weight of basic nitrogen in the form of a basic polyamide, a basic polyurethane, a basic polyurea or a mixture of two or more of these polymers incorporated therein. The basic polyamides are prepared by reaction of one or more dicarboxylic acids or suitable derivatives thereof, the acids being of aliphatic or aromatic type, with a polyamine, that is to say an amine having three or more amine groups, not more than two of which are primary amino groups. Optionally part of the polyamine reactant may be replaced by a diamine. The basic polyamides may therefore be copolymers containing residues derived from different dicarboxylic acids and/or different amines.

We have now found that basic polyamides, wherein a lactam is used in place of part of the dicarboxylic acid and/or part of the polyamine or diamine are capable of imparting a high affinity for acid dyestuffs to polyolefine compositions.

According to the present invention we provide a stereoregular polyolefine composition having a high affinity for acid dyestuffs, capable of being formed into shaped articles by melt spinning, extrusion or other shaping process, wherein the composition in addition to the polyolefine contains a basic polyamide, in a quantity sufficient to provide 0.05 to 1.0% by weight of basic nitrogen in the mixture, said basic polyamide being the product of one or more dicarboxylic acids or derivatives thereof with a polyamine and a lactam containing 6–12 carbon atoms.

Preferred basic polyamides according to this invention are those which are substantially insoluble or poorly soluble in water and have a crystallite melting point (measured using a polarising microscope fitted with a hot-stage) of 50° to 250° C. Such polymers are less readily removed by scouring, or other wet processes to which articles prepared from the polyolefine compositions, such as fibres and fabrics, may be subjected. If the crystallite melting point of the basic polyamide exceeds about 250° C. the polyolefine composition containing it is less readily shaped into uniformly dyeable articles.

The solubility in or compatibility with the polyolefines of basic polyamides used in this invention is controlled largely by the length of the carbon chains in the reactants. We prefer to use at least one reactant having at least one carbon chain of 4–12 carbon atoms. Alternatively a monofunctional reactant, which may be an amine or carboxylic acid may be used in the polymerisation process to control the molecular weight of the polymer produced or its compatibility with the polyolefine, in which case a carbon chain length of 4–24 atoms is preferred. As in the preparation of basic polyamides according to the parent application above referred to, optionally part of the polyamine reactant may be replaced by a diamine.

Aliphatic acids which may be used to produce the basic polyamides are malonic, succinic, glutaric, adipic, pimelic, suberic, azelaic, sebacic and dodecanedioic acids and alkyl substituted aliphatic dicarboxylic acids. Aromatic, cycloalkyl or alkylaryl dicarboxylic acids may also be used.

The preferred polyamines are the aliphatic triamines, wherein the third amino group is a secondary or tertiary amino group, but aliphatic or aromatic polyamines having more than three amino groups, not more than two of which are primary amino groups, may also be used. Likewise we prefer to use aliphatic diamines in the preparation of the basic copolyamides but aromatic, cycloalkyl or alkylaryl diamines also produce satisfactory basic copolyamides.

As examples of the polyamines there may be mentioned N:N-di(β-aminoethyl)amine, (diethylene triamine), N:N-di(γ-aminopropyl)amine, N:N-di(β-aminoethyl)methylamine, N:N - di(β - aminoethyl)ethylamine, N:N - di(γ-aminopropyl)ethylamine, N:N-di(δ-amino-n-butyl)amine and N:N-di(ω-amino-n-hexyl)amine (bishexamethylene triamine).

If desired the lactams can be used in the form of the corresponding aminoacid, and as examples of the lactams or aminoacids there may be mentioned 9-aminononsnoic acid, 11-aminoundecanoic acid, 12-aminododecanoic acid, or aminoacids there may be mentioned 9-aminononanoic acid, dodecanolactam, 17-aminoheptadecanoic acid, enantholactam, ε-amino-caproic acid and, above all, caprolactam.

The basic polyamides used in this invention can be obtained by heating the reactants together, preferably at temperatures between 180° and 290° C. until the required degree of polymerisation has been obtained. The polymerisation is preferably carried out in the absence of air using 0.05–10 moles of the polyamine per mole of the lactam and 0.3–1.1 moles of dicarboxylic acid per mole of the polyamine.

In common with polyamides generally the basic polyamides used in this invention may show a tendency to yellow discolouration when heated. This tendency when present is also evident in the polyolefine compositions of this invention and the dyeability of fibres or articles shaped from the compositions may be influenced by changes incurred in the discolouration reaction. The tendency to discolour may be overcome or at least minimised by treatment of the shaped articles, after shaping, with antioxidant substances, as for example, an organophosphite such as that marketed by Pure Chemicals Limited under the name "Phosclere" T.268. The discolouration tendency may also be inhibited by incorporation of suitable substances in the polyolefine compositions prior to shaping. We have found "Phosclere" T.268, sebacic dihydrazide, sodium dodecylbenzene sulphonate and sodium dodecaphosphotungstate to be effective substances when incorporated in this way.

The amount of basic polymer in the polyolefine compositions is to some extent dependent upon the particular polymer used and the depth of shade required in articles shaped therefrom. In general 0.5–20% by weight of the polyolefine, preferably 1–10%, is an adequate amount and this amount of additive does not interfere with the processing of the polyolefine or impair the properties of the articles shaped therefrom. As the acid dye affinity is primarily dependent upon the amount of basic nitrogen present in the composition and as the basic nitrogen content of the added basic polymer may vary, we prefer to control the amount of added polymer, within the foregoing limits, in terms of the basic nitrogen content of the polyolefine composition. For pale dyeings as little as 0.05% basic nitrogen may be used but for the highest build-up of colour and the deepest shades a larger amount is required. In general 0.05–1.0% by weight of basic nitrogen in the mixture is sufficient for all purposes.

The present invention is applied to any stereoregular polyolefine and we have found it to be particularly useful for enhancing the dye affinity, in particular for acid dyestuffs or premetallised dyestuffs, of shaped articles of stereoregular polyolefines (as for example linear polyethylene, stereoregular poly(4-methylpentene-1) or isotactic polypropylene), from which useful textile fibers or filaments may be produced by melt or solution spinning. The invention is not limited to enhancing the acid dye affinity of articles for textile uses but may be equally readily applied to other shaped articles of stereoregular polyolefines, as for example, films, mouldings or extrusions.

The polyolefine compositions may be prepared by intimately mixing the polymers by any method, as for example, tumbling the powdered polymers together, mixing of the powdered polyolefine with a solution of the basic polyamide in a volatile solvent, followed by drying and granulation of the mixture or by milling the polymers in a hot roll or Banbury mixer. Uniform and intimate mixture of the polymers may be facilitated by the addition of dispersing agents, as for example surface active agents such as long chain fatty alcohols.

The examples which follow illustrate the nature of the invention and the manner in which it may be performed. In these all parts and percentages are by weight, and melting points are measured using a hot-stage polarising microscope.

EXAMPLE 1

A basic copolyamide is prepared by heating together adipic acid (146 parts), bis-hexamethylene triamine (226 parts) and ε-caprolactam (1017 parts) for 2 hours at 224° C. under ordinary pressure. The product, which has a crystallite melting point of 190° C. and a viscosity ratio of 1.16 (0.5% solution in 90% formic acid at 250° C.) contains 1.7% of basic nitrogen as determined by titration.

The powdered copolyamide (5 parts) is mixed thoroughly with powdered isotactic polypropylene (45 parts) and melt spun at 210° C. The spun yarn is drawn at a draw ratio of 4.0:1 using a snubbing pin heated to 110° C. and a hot plate heated to 120° C. giving a drawn yarn of 5.1 denier per filament which is heat treated in the relaxed state for 30 minutes at 140° C. and which is readily dyeable with the acid dyestuffs Solway Sky Blue B (C.I. No. 62,105) and Nylomine Blue G (C.I. Acid Blue 14).

EXAMPLE 2

A basic copolyamide is prepared by heating together a mixture of adipic acid (730 parts), bis-hexamethylene triamine (1080 parts) and caprylactam (705 parts) for two hours at 260° C. under an atomsphere of nitrogen.

The product, which has a crystallite melting point of 143° C. and a viscosity ratio of 3.52 (0.5% solution in 90% formic acid at 25° C.), contains 3.7% of basic nitrogen and 0.06% of carboxyl end groups as determined by titration.

The powdered copolyamide (5 parts) is mixed thoroughly with powdered isotactic polypropylene (45 parts) and melt spun at 210° C. The spun yarn, drawn as in Example 1, is readily dyeable with the acid dyestuffs Solway Sky Blue B (C.I. No. 62105) and Nylomine Red 2BS (C.I. Acid Red 266), the dyebath being completely exhausted.

EXAMPLE 3

A basic copolyamide is prepared by heating together adipic acid (292 parts) dodecanolactam (1576 parts) and aluminum chloride (2.7 parts) for 1¼ hours at 280° C. under an atmosphere of nitrogen. The mixture is cooled to 100° C. and bis-hexamethylene triamine (440 parts) is added and the mixture is stirred for a further 30 minutes at 280° C. under nitrogen.

The product, which has a crystallite melting point of 145° C. and a viscosity ratio of 1.68 (0.5% solution in 90 formic acid at 250° C.) contains 1.8% of basic nitrogen and 0.2% of carboxyl end groups as determined by titration.

The powdered copolyamide (5 parts) is mixed thoroughly with powdered isotactic polypropylene (45 parts) and melt-spun at 210° C. The spun yarn, drawn as in Example 1, is readily dyeable with the acid dyestuffs Solway Sky Blue B (C.I. No. 62105) and Nylomine Blue G (C.I. Acid Blue 14), the dyebath being exhausted.

What we claim is:

1. A stereoregular polyolefine composition having a high affinity for acid dyestuffs, capable of being formed into shaped articles by melt spinning, extrusion or other shaping processes, wherein the composition in addition to the polyolefine contains 0.5%–20% by weight of a basic polyamide in a quantity sufficient to provide 0.05–1.0% by weight of basic nitrogen in the mixture, said basic polyamide being the product of reaction of one or more dicarboxylic acids or derivatives thereof with a polyamine having at least 3 amino groups, at least one of which is secondary or tertiary and a lactam containing 6–12 carbon atoms the polymerization of the polyamide having been carried out using 0.05–10 moles of the polyamine per mole of lactam and 0.3–1.1 moles of dicarboxylic acid per mole of polyamine.

2. A composition according to claim 1 wherein the added polymer has a crystallite melting point of 50–250° C.

3. A composition according to claim 1 wherein the added polymer is a copolymer.

4. A composition according to claim 3 wherein the copolymer is formed by replacing part of the polyamine reactant with a diamine.

5. A composition according to claim 1 wherein the lactam is caprolactam.

6. A composition according to claim 1 wherein the lactam is capryllactam.

7. A composition according to claim 1 wherein the lactam is dodecanolactam.

8. A composition according to claim 1 wherein 0.5–20% by weight of the added polymer is used.

9. A composition according to claim 6 wherein 1–10% by weight of the added polymer is used.

10. A composition according to claim 1 wherein the polyolefine is selected from the group consisting of linear polyethylene, stereoregular poly-(4-methylpentene-1) and isotactic polypropylene.

11. Shaped articles produced by melt spinning extrusion or other shaping process from a composition according to claim 1.

References Cited

UNITED STATES PATENTS

| | | | |
|---|---|---|---|
| 3,161,608 | 12/1964 | Caldwell | 260—857 |
| 3,326,826 | 6/1967 | Cohen | 260—857 |
| 3,331,888 | 7/1967 | Cantatore | 260—857 |
| 3,107,228 | 10/1963 | Cappucio | 260—857 |
| 3,361,843 | 1/1968 | Miller | 260—857 |

MURRAY TILLMAN, Primary Examiner

P. LIEBERMAN, Assistant Examiner

U.S. Cl. X.R.

260—78, 94.9, 93.7, 45.9, 45.7, 45.75